(12) United States Patent
Yamanaka

(10) Patent No.: US 12,515,540 B2
(45) Date of Patent: Jan. 6, 2026

(54) VEHICLE

(71) Applicant: TOYOTA JIDOSHA KABUSHIKI KAISHA, Toyota (JP)

(72) Inventor: Noriyuki Yamanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 289 days.

(21) Appl. No.: 18/449,319

(22) Filed: Aug. 14, 2023

(65) Prior Publication Data

US 2024/0149707 A1    May 9, 2024

(30) Foreign Application Priority Data

Nov. 4, 2022  (JP) .................................. 2022-177282

(51) Int. Cl.
| | |
|---|---|
| *B60L 50/64* | (2019.01) |
| *B60K 1/04* | (2019.01) |
| *H01M 10/42* | (2006.01) |
| *H02J 7/00* | (2006.01) |

(52) U.S. Cl.
CPC ................ *B60L 50/64* (2019.02); *B60K 1/04* (2013.01); *H01M 10/425* (2013.01); *H02J 7/007* (2013.01); *H01M 2220/20* (2013.01)

(58) Field of Classification Search
CPC . B60L 50/64; B60L 1/04; H02J 7/007; H01M 10/425; H01M 2220/20
See application file for complete search history.

(56) References Cited

U.S. PATENT DOCUMENTS

| | | | |
|---|---|---|---|
| 10,933,762 B2* | 3/2021 | Satake | ...................... B60K 6/22 |
| 2015/0097527 A1* | 4/2015 | DeDona | ................... B60L 50/16 |
| | | | 320/109 |
| 2020/0017042 A1* | 1/2020 | Boesch | .................. B60L 3/0092 |
| 2020/0023765 A1* | 1/2020 | Lee | ...................... G06Q 10/0838 |
| 2020/0207222 A1* | 7/2020 | Kanzaki | .................. B60L 53/22 |

FOREIGN PATENT DOCUMENTS

| | | |
|---|---|---|
| JP | 2010-188860 A | 9/2010 |
| JP | 2012-085481 A | 4/2012 |
| JP | 2015-131577 A | 7/2015 |
| JP | 2016-168928 A | 9/2016 |
| JP | 2021-004021 A | 1/2021 |
| WO | 2012/049559 A2 | 4/2012 |

* cited by examiner

*Primary Examiner* — Syed O Hasan
(74) *Attorney, Agent, or Firm* — SoraIP, Inc.

(57) ABSTRACT

The vehicle includes a pair of side members; a rear cross member; a battery; a first power converter connected to the battery; a first relay switching the battery and the first power converter between an energized state and a non-energized state; a second power converter connected to the battery in parallel with the first power converter; a second relay switching the battery and the second power converter between an energized state and a non-energized state. The first relay switches the battery and the first power converter to an energized state while the vehicle is traveling, the second relay switches the battery and the second power converter to the non-energized state. The first power converter is forward of the rear cross member in the vehicle and disposed between the side members in the vehicle width direction. A second power converter is disposed behind the rear cross member in the vehicle.

2 Claims, 1 Drawing Sheet

VEHICLE

CROSS-REFERENCE TO RELATED APPLICATION

This application claims priority to Japanese Patent Application No. 2022-177282 filed on Nov. 4, 2022, incorporated herein by reference in its entirety.

BACKGROUND

1. Technical Field

The technique disclosed in the present specification relates to a vehicle.

2. Description of Related Art

Japanese Unexamined Patent Application Publication No. 2021-004021 (JP 2021-004021 A) discloses a vehicle including a power converter that is connected to a battery in an energized state during traveling.

SUMMARY

The above technique does not disclose a configuration in which two power converters connected in parallel to each other with respect to a battery are arranged.

The present specification provides a technique for installing power converters in a vehicle including two power converters that are connected in parallel to each other with respect to a battery, while ensuring safety of the power converters.

A first aspect of the technique disclosed in the present specification relates to a vehicle. The vehicle includes: a pair of side members, the side members disposed spaced apart from each other in a vehicle width direction and extending in a vehicle front-rear direction; a rear cross member extending from one of the side members to the other of the side members;
  a battery; a first power converter connected to the battery;
  a first relay that switches the battery and the first power converter between an energized state and a non-energized state;
  a second power converter connected to the battery in parallel with the first power converter;
  and a second relay that switches the battery and the second power converter between the energized state and the non-energized state. The first relay places the battery and the first power converter in the energized state while the vehicle is traveling. The second relay places the battery and the second power converter in the non-energized state while the vehicle is traveling. The first power converter is disposed forward of the rear cross member in the vehicle front-rear direction and between the side members in the vehicle width direction.
The second power converter is disposed rearward of the rear cross member in the vehicle front-rear direction.

According to this configuration, it is possible to downsize each power converter by disposing the two power converters separately depending on whether the power converters are energized while the vehicle is traveling. The first power converter that is energized with the battery while the vehicle is traveling may be disposed in an area protected by the side members and the rear cross member. This makes it possible to protect the first power converter in the event of a collision of the vehicle. On the other hand, the second power converter that is not energized with the battery while the vehicle is traveling is disposed behind the rear cross member, whereby the second power converter does not have to occupy a space forward of the rear cross member. The first power converter can be mounted on the vehicle while the safety of the first power converter is ensured.

According to a second aspect of the present disclosure, in the first aspect, there may further be provided an electric cable that connects the battery and the first power converter and through which current flowing from the battery toward the first power converter flows while the vehicle is traveling. A terminal connected to the electric cable of the first power converter and the electric cable may be disposed forward of the rear cross member in the vehicle front-rear direction.

According to this configuration, the electric cable and the terminal that are energized while the vehicle is traveling can be disposed in the area protected by the side members and the rear cross member. This makes it possible to mount the electric cable and the terminal on the vehicle while the safety of the electric cable and the terminal is ensured.

According to a third aspect, in the first or second aspect, the first power converter may be disposed in a vehicle cabin for an occupant of the vehicle.

According to this configuration, the first power converter can be disposed in an area surrounded by the side members, the rear cross member, and the structural body constituting the vehicle cabin. This makes it possible to protect the first power converter by the side members, the rear cross member, and the specific cross member.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
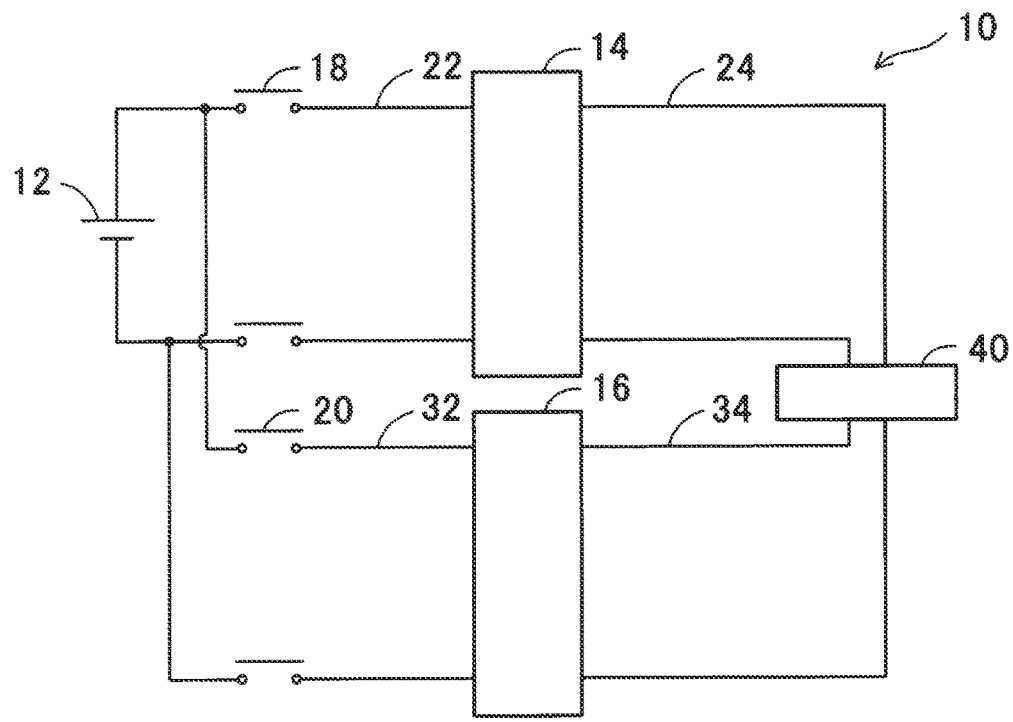
FIG. 1 is a block-diagram illustrating a connection between a battery and a power converter.

As illustrated in FIG. 1, the vehicle 10 includes a battery 12, power converters 14 and 16, relays 18 and 20, electric cables 22, 24, 32, and 34, and a charging inlet 40. The battery 12 supplies electric power to an electric device mounted on the vehicle 10. The electric equipment includes a motor for traveling, an air conditioner, and the like.

The power converter 14 is electrically connected to the battery 12 via an electric cable 22. The power converter 14 converts the DC power of the battery 12 into power for supplying the electric equipment of the vehicle 10. The power converter 14 includes an inverter and a converter. A relay 18 is disposed in the electric cable 22. The relay 18 is disposed between the battery 12 and the power converter 14. The relay 18 switches between an energized state and a non-energized state. In the relay 18, the energized state and the non-energized state are switched by a main control device (not shown) of the vehicle 10. In the energized state, the relay 18 energizes the battery 12 and the power converter 14 via the electric cable 22. In the non-energized state, the relay 18 interrupts the energization of the battery 12 and the power converter 14.

The power converter 14 is electrically connected to the charging inlet 40 via an electric cable 24. The charging inlet 40 is connectable to a power cable of an external power source. The power converter 14 converts electric power supplied from an external power source into electric power for charging the battery 12 in a state where the power cable of the external power source is connected to the charging inlet 40. The power converter 14 converts bidirectional power in a direction from the battery 12 toward the electric device and a direction from the charging inlet 40 toward the battery 12.

The power converter 16 is electrically connected to the battery 12 via an electric cable 32. The power converter 16 and the power converter 14 are connected in parallel to the battery 12. A relay 20 is disposed in the electric cable 32. The relay 20 is disposed between the battery 12 and the power converter 16. The relay 20 switches between an energized state and a non-energized state. In the relay 20, the energized state and the non-energized state are switched by a main control device (not shown) of the vehicle 10. In the energized state, the relay 20 energizes the battery 12 and the power converter 16 via the electric cable 32. In the non-energized state, the relay 20 interrupts the energization of the battery 12 and the power converter 16.

The power converter 16 is electrically connected to the charging inlet 40 via an electric cable 34. The power converter 16 converts electric power supplied from an external power source into electric power for charging the battery 12 in a state where the power cable of the external power source is connected to the charging inlet 40. The power converter 16 converts power in one direction from the charging inlet 40 to the battery 12. Switching between relays 18 and 20

In the vehicle 10, a power cable of an external power source is connected to the charging inlet 40 while the vehicle 10 is stopped. When the relays 18 and 20 are maintained in the energized state, the electric power of the external power source is converted by the two power converters 14 and 16 and supplied to the battery 12. Accordingly, the battery 12 is charged. In this case, the electric cables 22, 24, 32, 34 are energized. According to this configuration, the charging of the battery 12 can be accelerated as compared with the case where one power converter 14 is used. Further, by arranging the power converters 14 and 16 in two units, it is possible to suppress an increase in size of one power converter.

For example, in a case where the vehicle 10 is powered on and an electric device mounted on the vehicle 10 is being used, such as during traveling of the vehicle 10, the relay 18 is maintained in the energized state, while the relay 20 is maintained in the non-energized state. In this case, the electric cables 32, 34 are not energized. The electric cable 22 is energized. The electric cable 24 is not energized. Power from the battery 12 is supplied to the power converter 14 via an electric cable 22. The power converter 14 converts electric power from the battery 12 and supplies the electric power to the electric device mounted on the vehicle 10 via the electric cable 26 (see FIG. 2).

Figure 2:
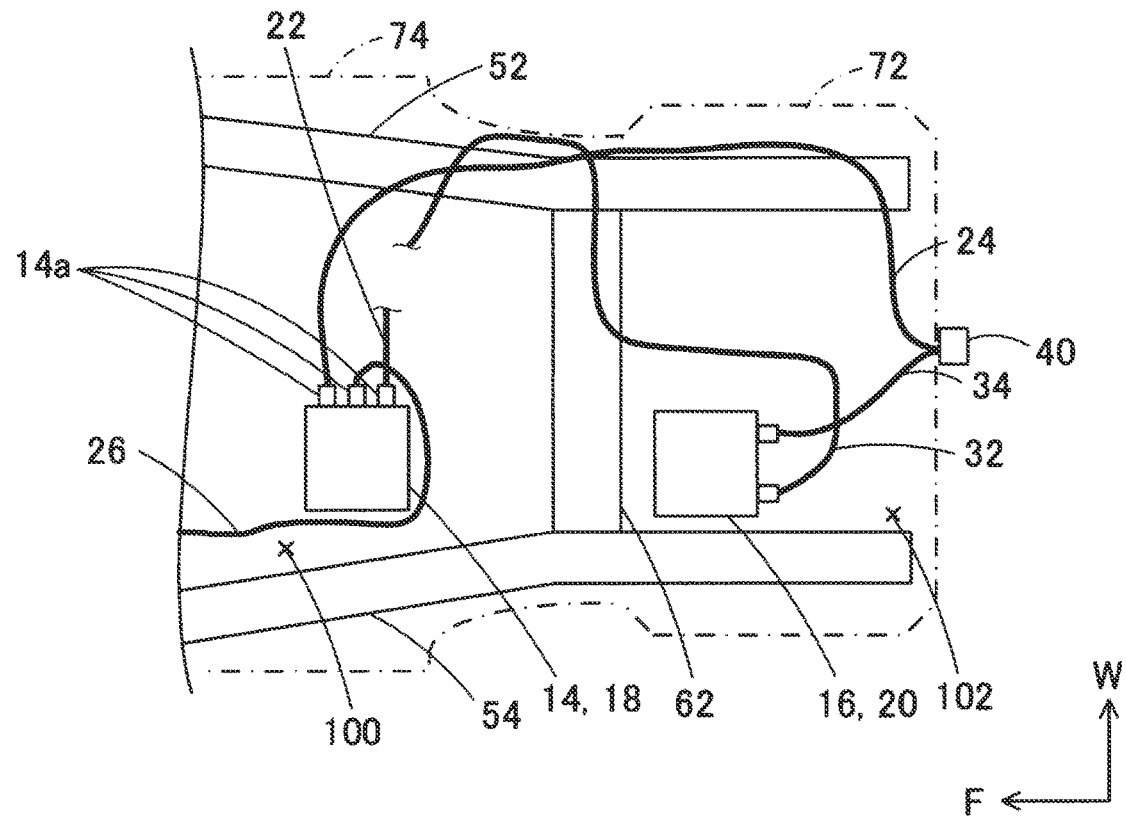
FIG. 2 is a plan view illustrating the arrangement of the power converters.

As illustrated in FIG. 2, the vehicle 10 includes a pair of side members 52 and 54 and a rear cross member 62. The side members 52 and 54 are disposed at respective ends in the vehicle width direction W, respectively. The side member 52 extends in the front-rear direction F. The side member 52 is a vehicle body skeleton member of the vehicle 10. The side member 52 is formed in a closed cross-sectional structure, for example. The side member 52 is formed by joining a plurality of members in the front-rear direction F. The side member 52 extends in the front-rear direction F from the vehicle cabin 100, which is a vehicle cabin for an occupant of the vehicle 10, beyond the rear end of the vehicle cabin 100 to the luggage compartment 102 located behind the vehicle cabin 100. The side member 54 has a similar configuration.

The rear cross member 62 extends from the side member 52 to the side member 54 in the vehicle width direction W. The rear cross member 62 is joined to each of the side members 52 and 54. The rear cross member 62 is a vehicle body skeleton member. Rear cross member 62, for example, is formed in a closed cross-section structure. The rear cross member 62 is disposed between the floor panels 72, 74. The floor panel 72 defines a bottom surface of the luggage compartment 102. A rear cross member 62 is joined to a front end of the floor panel 72. Each of the side members 52 and 54 is joined to each of both ends of the floor panel 72 in the vehicle width direction W.

A bumper reinforcement or the like extending along the vehicle width direction W is disposed behind the floor panel 72. However, the skeleton member along the vehicle width direction W joined to the side member 52 and the side member 54 is not arranged, such as the rear cross member 62, behind the rear cross member 62. The rear cross member 62 is a skeleton member in the vehicle width direction W disposed at the rearmost position of the vehicle 10.

The rear cross member 62 is disposed at the rear end of the floor panel 74. The floor panel 74 defines a bottom surface of the vehicle cabin 100. The vehicle cabin 100 is a space between the floor panel 74 and the roof panel of the vehicle 10. A seat is attached to the floor panel 74. The floor panel 74 is disposed over the entire length of the vehicle cabin 100 in the front-rear direction F. The floor panel 74 may be composed of two or more panels. In the vehicle cabin 100, the passenger is protected by the side members 52 and 54, the rear cross member 62, and other structures of the vehicle 10 such as pillars and the floor panel 74 extending in the up-down direction.

Like the rear cross member 62, a cross member extending from the side member 52 to the side member 54 may be disposed in front of the rear cross member 62.

The power converter 14 and the relay 18 are disposed in front of the rear cross member 62. The power converter 14 is disposed above the floor panel 74, for example. The battery 12 is disposed below the floor panel 74. The power converter 14 is electrically connected to the battery 12 by an electric cable 22 passing through the floor panel 74. The power converter 14 and the relay 18 are surrounded by a rear cross member 62 and a pair of side members 52 and 54.

The power converter 14 and the relay 18 are connected to the electric cable 22 via a terminal 14a. Like the power converter 14, the terminal 14a and the electric cable 22 are also surrounded by the rear cross member 62 and the pair of side members 52 and 54. The power converter 14, the relay 18, the terminal 14a, and the electric cable 22 are arranged in the vehicle cabin 100.

A portion of the electric cable 24 extending from the power converter 14 to the charging inlet 40 is routed outside the vehicle 10 rather than the side member 52.

On the other hand, the power converter 16 and the relay 20 are disposed behind the rear cross member 62. The power converter 16 and the relay 20 are attached to the floor panel 72. The electric cables 32, 34 are arranged behind the rear cross member, similar to the power converter 16 and the relay 20. The power converter 16 and the relay 20 are disposed in the luggage compartment 102.

The power converter 14 is supplied with electric power from the battery 12 while the vehicle 10 is traveling. In the vehicle 10, the power converter 14 is surrounded by a rear cross member 62 and a pair of side members 52 and 54.

Accordingly, the power converter 14 can be protected by the rear cross member 62 and the pair of side members 52 and 54 at the time of collision of the vehicle 10. Further, by placing the power converter 14 in the vehicle cabin 100, the power converter 14 can be more securely protected. The same applies to the terminal 14a and the electric cable 22. Accordingly, in order to protect the power converter 14, it is not necessary to newly dispose a protection member such as a protector. As a result, it is not necessary to provide a space for mounting the protective member.

Further, the power converter 14, the terminal 14a, and the electric cable 22 are arranged at a distance from the side members 52 and 54 to the inside of the vehicle 10 in the vehicle width direction W in anticipation of deformation of the side members 52 and 54 to the inside of the vehicle 10 in the event of a collision of the vehicle 10, in particular a collision from a side surface. Accordingly, it is possible to suppress the power converter 14, the terminal 14a, and the electric cable 22 from being damaged when the vehicle 10 collides.

On the other hand, the power converter 16, which is not supplied with electric power during traveling of the vehicle 10, is disposed behind the rear cross member 62. Further, by disposing the power converter 16 behind the rear cross member 62, it is possible to avoid the vehicle cabin 100 being narrowed by the power converter 16.

At least a part of the power converter 14, the terminal 14a, and the electric cable 22 may or may not overlap with the side members 52 and 54 and the rear cross member 62.

Although the specific examples have been described in detail above, these are merely examples and do not limit the scope of claims. The techniques described in the claims include various modifications and alternations of the specific example illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. A vehicle comprising: a pair of side members, the side members disposed spaced apart from each other in a vehicle width direction and extending in a vehicle front-rear direction, each of the side members being a vehicle body skeleton member and having a closed cross-sectional structure; a rear cross member extending from one of the side members to the other of the side members in the vehicle width direction, the rear cross member disposed at a rearmost position of the vehicle, and the rear cross member being the vehicle body skeleton member having the closed cross-sectional structure; a first floor panel defining a bottom surface of a vehicle cabin, the vehicle cabin being a space between the first floor panel and a roof panel of the vehicle, the first floor panel being disposed over an entire length of the vehicle cabin in the vehicle front-rear direction, and the rear cross member being disposed at a rear end of the first floor panel, a second floor panel defining a bottom surface of a luggage compartment of the vehicle disposed behind the vehicle cabin, the rear cross member being joined to a front end of the second floor panel, and each of the side members being joined to each of both ends of the second floor panel in the vehicle width direction; a battery disposed below the first floor panel; a first power converter connected to the battery, the first power converter disposed in the vehicle cabin forward of the rear cross member in the vehicle front-rear direction between the side members in the vehicle width direction, and the first power converter being surrounded by the rear cross member and the side members in a plan view; a first relay disposed between the battery and the first power converter, and configured to switch the battery and the first power converter between an energized state and a non-energized state, the first relay being arranged in the vehicle cabin and being surrounded by the rear cross member and the side members in the plan view; a first electric cable that passes through the first floor panel, the first electric cable being configured to supply power from the battery to the first power converter: a terminal connected to the first power converter and the first relay via the first electric cable, the terminal and the first electric cable being surrounded by the rear cross member and the side members in the plan view; a second power converter connected to the battery via a second electric cable in parallel with the first power converter, the second power converter being attached to the second floor panel, and the second converter disposed behind the rear cross member in the vehicle front-rear direction in the luggage compartment; a second relay disposed in the luggage compartment and connected between the battery and the second power converter, the second relay being attached to the second floor panel, and configured to switch the battery and the second power converter between the energized state and the non-energized state; and a charging inlet connected to the first power converter via a third electric cable, and connected to the second power converter via a fourth electric cable, wherein the first relay places the battery and the first power converter in the energized state while the vehicle is traveling, the second relay places the battery and the second power converter in the non-energized state while the vehicle is traveling, and the first power converter, the terminal, and the first electric cable are arranged at a distance inward in the vehicle width direction from the side members to suppress damage to the first power converter, the terminal, and the first electric cable, in an event of a vehicle collision.

2. The vehicle according to claim 1, wherein at least a part of the first power converter, the terminal, and the first electric cable overlaps with at least one of the side members and the rear cross member in the plan view.

* * * * *